United States Patent [19]
Elam

[11] 3,873,531
[45] Mar. 25, 1975

[54] 2-{P-[2-(2-BENZOXAZOLYL)VINYL]-PHENYL}OXAZOLO [5,4-B]PYRIDINE FLUORESCENT WHITENING AGENTS
[75] Inventor: Edward U. Elam, Kingsport, Tenn.
[73] Assignee: Eastman Kodak Company, Rochester, N.Y.
[22] Filed: Mar. 29, 1974
[21] Appl. No.: 456,399

[52] U.S. Cl....260/240 D, 117/33.5 T, 252/301.2 W, 260/240.1
[51] Int. Cl............................................ C07d 85/48
[58] Field of Search..................... 260/240 D, 240.1; 252/301.2 W

[56] References Cited
UNITED STATES PATENTS
3,530,119  9/1970  Schinzel et al................. 260/240 D
3,712,888  1/1973  Kaempfen.................... 252/301.2 W
3,712,982  1/1973  Meunier et al. ................ 260/240.1

FOREIGN PATENTS OR APPLICATIONS
2,020,817   6/1971   Germany

Primary Examiner—Arthur P. Demers

[57] ABSTRACT
The compounds, 2-{p[2-(2-benzoxazolyl)vinyl]-phenyl}oxazolo[5,4-b]pyridines are new compositions of matter useful for fluorescent whitening of textiles.

4 Claims, No Drawings

2-{P-[2-(2-BENZOXAZOLYL)VINYL]-PHENYL}OXAZOLO[5,4-B]PYRIDINE FLUORESCENT WHITENING AGENTS

This invention concerns novel 2-styrylbenzoxazole derivatives which are useful as fluorescent whitening agents for synthetic fibers, particularly for polyester, nylon and acetate. Specifically, the invention relates to novel 2-{p-[2-(2-benzoxazolyl)vinyl]phenyl}oxazolo[5,4-b]-pyridine derivatives of the formula

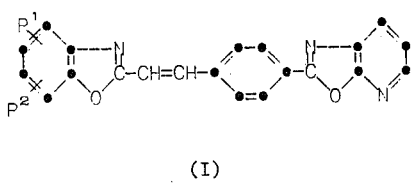

(I)

where R¹ and R² may be the same or different and are selected from hydrogen, alkyl containing from one to five carbon atoms, alkoxy containing from one to five carbon atoms, and chlorine.

The use of substituted ethylene derivatives as fluorescent whitening agents is well known in the art. 1,2-Bis(5-methylbenzoxazol-2-yl)ethylene,

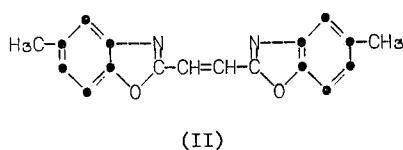

(II)

for example, has been used commercially for whitening synthetic fibers, particularly polyester and cellulose acetate for many years. Similarly, derivatives of p-phenylenevinylenebisbenzoxazole,

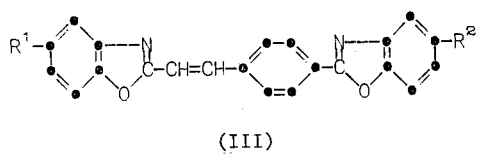

(III)

are also used for this purpose as disclosed in U.S. Pat. No. 3,565,890. Finally, derivatives of 4,4'-bis(oxazol[5,4-b]pyridine-2-yl)stilbene of the formula

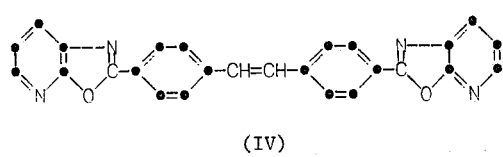

(IV)

have been reported to be useful, particularly for the melt phase brightening of polymeric materials (British Pat. No. 1,242,836 and Belgian Pat. No. 749,630).

Each of these prior art compounds possesses certain disadvantages which limit its usefulness. The bisbenzoxazolylethylene derivatives (II) are highly recommended for topical application to polyester and acetate fibers, but they have limited usefulness on polyamide. The same is true of the p-phenylenevinylenebisbenzoxazoles (III). The bis-oxazolopyridylstilbenes (IV) are excellent for melt phase brightening of polymers, but are not satisfactory for topical application to any of the commonly used synthetic fibers. The compounds of the present invention, on the other hand, are useful particularly for topical application to a wide range of synthetic fibers, including polyester, polyamides (nylon) and cellulose acetate.

In a preferred embodiment of the invention, the compounds of Structure I above are prepared, for example, from the known 4-[2-(benzoxazol-2-yl)vinyl]benzoates by conversion to the acid chloride and reaction with 3-amino-2-chloropyridine followed by cyclization in the presence of cupric acetate and metallic zinc as described for the 4,4'-bis(oxazol[5,4-b]pyridin-2-yl)stilbenes in British Pat. No. 1,242,836.

The following examples illustrate the preparation and application of representative compounds of this invention. The whitening compounds may be applied to the fiber in concentrations of from about 0.05 to about 1.0%, preferably from about 0.1 to 0.5% by weight based on fiber weight.

EXAMPLE 1

A suspension of 6.5 g. (0.05 mole) of 2-chloro-3-aminopyridine in 150 ml. of chlorobenzene is heated to 100°C. and 15.4 g. of 4-[2-(5,7-dimethylbenzoxazol-2-yl)vinyl]benzoyl chloride (prepared in the usual manner from the corresponding carboxylic acid and thionyl chloride) is added. The mixture is refluxed for 8 hrs., cooled, filtered and washed successively with chlorobenzene and benzene, then dried. The product is recrystallized from trichlorobenzene to give 12.3 g. of N-(2-chloro-3-pyridyl)-4-[2-(5,7-dimethylbenzoxazol-2-yl)vinyl]benzamide, melting point 238° to 240°C.

This amide (12.3 g., 0.03 mole) is dissolved in 80 ml. of dry pyridine and 240 ml. of dry dimethylformamide, and 17.5 g. of anhydrous cupric acetate and 3.2 g. of granular zinc is added. The mixture is refluxed for 3 hr., cooled and poured into water. The product is filtered, washed with water and then with 200 ml. of dilute ammonium hydroxide solution and finally slurried with 200 ml. of 2% potassium carbonate solution, filtered and washed with water. The product of the formula

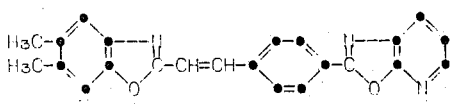

is purified by successive recrystallization from trichlorobenzene and dimethylformamide followed by sublimation to give a yellow solid, mp. 287° to 289°C. Anal. Calcd. for $C_{21}H_{17}N_3O_2$: C, 75.18; H, 4.67; N, 11.44. Found: C, 74.49; H, 4.76; N, 11.67.

EXAMPLE 2

The compound

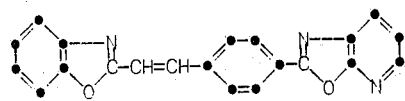

is prepared in an analogous manner, starting with 4-[2-(benzoxazol-2-yl)vinyl]benzoic acid and 2-chloro-3-aminopyridine.

EXAMPLE 3

A dispersion of the compound described in Example 1 is prepared using polyvinyl alcohol ("Elvanol 51-05") as the protective colloid. A sample of nylon 66 fabric is wet with a dilute solution of an anionic wetting agent ("Igepon T-51," sodium N-methyl-N-oleyl taurate), placed in a dyebath containing 0.2% based on weight of fiber of said compound, which is brought to the boil. The fabric is dyed at the boil for 1 hour, then rinsed with demineralized water. The resulting fabric is markedly whitened, and the whitening effect is stable to exposure in a carbon-arc Fade-Ometer.

EXAMPLE 4

The procedure of Example 3 is followed using cellulose acetate fabric and dyeing at 80°C. This fabric also is markedly whiter than untreated fabric.

EXAMPLE 5

A sample of poly(ethylene terephthalate) is dyed at the boil for 1 hour with dispersion prepared as described in Example 3 using 5 g./liter of trichlorobenzene as a carrier. The treated fabric is given an after-scour with a solution of 1 g./liter of soap and 1 g./liter of sodium carbonate and finally dried and heat set at 350°F. for 5 minutes to remove the last of the carrier. The resulting fabric is much whiter than untreated fabric and the whitening effect is exceedingly durable to light.

Whiteners containing the groups below give improved brightness to the disclosed fabrics.

| Example | $R^1$ | $R^2$ |
|---|---|---|
| 6 | —OCH$_3$ | —H |
| 7 | —OCH$_3$ | —C$_2$H$_5$ |
| 8 | —OCH$_3$ | —Cl |
| 9 | —OC$_2$H$_5$ | —OC$_2$H$_5$ |
| 10 | —Cl | —Cl |
| 11 | —C$_4$H$_9$ | —Cl |
| 12 | —C$_4$H$_9$ | —C$_4$H$_9$ |
| 13 | —COOCH$_3$ | —COOCH$_3$ |
| 14 | —COOC$_2$H$_5$ | —Cl |
| 15 | —COOC$_2$H$_5$ | —CH$_3$ |
| 16 | —COOCH$_3$ | —OCH$_3$ |
| 17 | —COOCH$_3$ | —H |

Although the examples illustrate one method for preparing the compounds of my invention and typical methods for applying them to the usual synthetic fibers, other methods of preparation and of application to the fibers, such as the Thermosol process, are also applicable. It is also possible to apply the fluorescent whitening agents of this invention in combination with other fluorescent whitening agents, such as those which are substantive to cotton when polyester-cotton fabric is being whitened, or with textile auxiliaries, permanent press resins, tinting dyes and the like.

The invention has been described in detail with particular reference to preferred embodiments thereof, but it will be understood that variations and modifications can be effected within the spirit and scope of the invention.

I claim:

1. The compounds having the formula

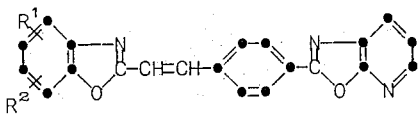

where $R^1$ and $R^2$ may be the same or different and are selected from hydrogen, alkyl containing from one to five carbon atoms, alkoxy containing from one to five carbon atoms, carbalkoxy containing from one to five carbon atoms in the alkyl moiety, and chlorine.

2. The compound according to claim 1 having the formula

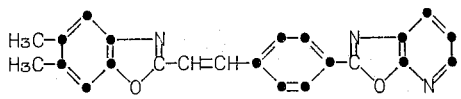

3. The compound according to claim 1 having the formula

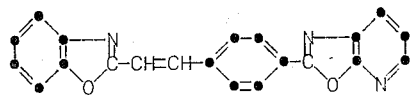

4. A fiber containing from about 0.05 to about 1.0% by weight of at least one of the compounds of claim 1.

* * * * *